(12) United States Patent
DeKoning et al.

(10) Patent No.: US 6,385,683 B1
(45) Date of Patent: May 7, 2002

(54) METHODS AND APPARATUS FOR RAID HARDWARE SEQUENCING TO ACHIEVE A HIGHER PERFORMANCE RAID ARCHITECTURE

(75) Inventors: Rodney A. DeKoning, Augusta; Dennis E. Gates; Keith W. Holt, both of Wichita; John R. Kloeppner, Buhler, all of KS (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/374,053

(22) Filed: Aug. 13, 1999

(51) Int. Cl.[7] .............................................. G06F 13/24
(52) U.S. Cl. ........................ 710/261; 710/262; 710/263; 710/264; 710/266; 710/48; 710/6; 711/114
(58) Field of Search ................................. 710/260–269, 710/46–50, 5–7; 711/114

(56) References Cited

U.S. PATENT DOCUMENTS

| 5,179,704 A | * | 1/1993 | Jibbe et al. ................. 710/262 |
| 5,671,365 A | * | 9/1997 | Binford et al. .............. 710/100 |
| 5,708,814 A | * | 1/1998 | Short et al. ................. 710/260 |
| 5,805,883 A | * | 9/1998 | Saitoh ........................ 709/105 |
| 5,875,343 A | * | 2/1999 | Binford et al. .............. 710/263 |
| 6,065,089 A | * | 5/2000 | Hickerson et al. .......... 710/266 |
| 6,115,776 A | * | 9/2000 | Reid et al. .................. 710/260 |
| 6,189,067 B1 | * | 2/2001 | Lowe et al. ................ 710/260 |
| 6,192,440 B1 | * | 2/2001 | Lowe et al. ................ 710/260 |
| 6,195,725 B1 | * | 2/2001 | Luhmann .................... 710/266 |
| 6,219,727 B1 | * | 4/2001 | Kailash et al. ................ 710/48 |
| 6,266,732 B1 | * | 7/2001 | Chen et al. ................. 710/263 |

* cited by examiner

Primary Examiner—Christopher B. Shin
(74) Attorney, Agent, or Firm—Townsend & Townsend & Crew

(57) ABSTRACT

The present invention provides storage system controllers and methods of controlling storage systems therewith. The controller (10) includes a main processor (12), a memory (14), a device interface (18) adapted to interface a peripheral component (28–32), such as a RAID storage device, with the storage system controller, and an operations sequencer (24). The main processor sequences a plurality of tasks to be executed to complete an operation. The operations sequencer coordinates an execution of the plurality of tasks. Methods of the invention include receiving a task status for each of the plurality of tasks that is executed, and issuing an interrupt to the main processor after all of the plurality of tasks of the operation are finished executing. In this manner, the operations sequencer offloads at least some of the main processor overhead to improve processor efficiency.

27 Claims, 4 Drawing Sheets

METHODS AND APPARATUS FOR RAID HARDWARE SEQUENCING TO ACHIEVE A HIGHER PERFORMANCE RAID ARCHITECTURE

BACKGROUND OF THE INVENTION

The present invention relates generally to RAID storage systems, and more particularly to RAID storage system controllers with improved performance.

The management of the multiple input/output (I/O) tasks which is inherent in processing RAID operations presents difficulties in providing the improved performance that is necessary for future generation RAID subsystems. This is due in part to the significant microprocessor overhead required to manage these large number of I/O tasks. In particular, a typical RAID read/modify/write command can require as many as six (6) or more individual I/O tasks. As one skilled in the art will appreciate, with the RAID controller designs currently known in the art, the controller's microprocessor typically must manage all these I/O tasks as they occur. The routines required to manage the RAID hardware set-up and the interrupt service threads for each of the individual RAID I/O tasks result in inefficient interruption of the microprocessor and thrashing of the microprocessor primary and secondary cache.

It is desirable, therefore, to reduce or offload at least a portion of the overhead from the primary microprocessor. It is further desirable to improve the management of multiple I/O tasks, particularly for RAID systems.

SUMMARY OF THE INVENTION

The present invention provides a storage system controller including a main processor, a memory coupled to the main processor, a device interface adapted to interface a peripheral component, such as a disk array, with the storage system controller, and an operations sequencer. The operations sequencer is adapted to receive an operation comprising a plurality of tasks from the main processor and to coordinate the execution of the plurality of tasks prior to interrupting the main processor. In this manner, the operations sequencer offloads at least some of the main processor overhead to improve processor efficiency.

One advantage of the present invention is the off-loading of overhead from the primary processor(s) by providing an operations sequencer that performs the hardware set-up and management tasks independent of the primary processor. The operations sequencer allows the primary processor to set-up the entire sequence of steps that will be executed for an I/O operation, such as a multi-step RAID operation. The primary processor then kicks off the sequencer with no further processing required by the processor until the sequencer has finished the operation or an exception has occurred that requires more sophisticated management than the sequencer has been designed to manage.

In one aspect, the main processor includes a RAID controller processor, the operations sequencer includes a RAID accelerator, and the peripheral component includes a RAID storage device. In this manner, the operations sequencer offloads a plurality of tasks for a RAID operation to improve controller efficiency.

In alternate aspects, the operations sequencer includes a co-processor in electrical communication with the main processor, or a co-processor disposed within the main processor. In further aspects, the operations sequencer includes a hardware state machine or an intelligent device interface.

In one aspect, the controller includes a plurality of device interfaces that are adapted to interface with a plurality of peripheral components. In this manner, the operations sequencer is adapted to coordinate operations for more than one peripheral component.

In still another aspect of the invention, the storage system controller further includes an interrupt management scoreboard coupled to or associated with the main processor or the operations sequencer. Exemplary scoreboards for use in the present invention are described in further detail in U.S. application Ser. No. 09/373,864, entitled "Methods and Apparatus for Using Interrupt Score Boarding with Intelligent Peripheral Devices," filed contemporaneously herewith, the complete disclosure of which is incorporated herein by reference.

The present invention further provides exemplary methods of controlling a storage system. One particular method includes providing a storage system controller having a main processor, a memory, a device interface, and an operations sequencer, and providing a storage system in electrical communication with the device interface. The main processor sequences a first plurality of tasks to be executed to complete a desired operation, such as a RAID operation. The operations sequencer receives the first plurality of tasks from the main processor and coordinates an execution of the first plurality of tasks. The method includes issuing a primary interrupt to the main processor after all of the first plurality of tasks of the operation are executed. In one aspect, the main processor polls for completion of the plurality of tasks.

In one particular aspect, the storage system controller further includes an interrupt management scoreboard coupled to or associated with the main processor or the operations sequencer. In one aspect, the method includes the scoreboard receiving a task status for each of the first plurality of tasks that is executed. In one embodiment, the operations sequencer writes the test status to the scoreboard. In another embodiment, the main processor writes the task status to the scoreboard. The task status comprises an error notification or a task complete notification in one embodiment.

In one aspect, the method further includes issuing a secondary interrupt to the main processor if the execution of one of the first plurality of tasks results in an error. In one aspect, the device interface issues the secondary interrupt. In one particular aspect, the main processor initiates a retry of the error-producing task to the device interface in response to the secondary interrupt. In this manner, a task that produces an error can be addressed by the main processor without necessarily effecting the operations sequencer, which in one embodiment continues to coordinate the execution of other tasks.

Preferably, the sequencing step includes sequencing the first plurality of tasks into a desired execution sequence, and the coordinating step includes coordinating the execution of the first plurality of tasks in accordance with the desired execution sequence.

The operations sequencer preferably is capable of handling more than one operation. For example, in one aspect, the method further includes sequencing a second plurality of tasks to be executed to complete a second desired operation, coordinating a second execution of the second plurality of tasks, and issuing a second primary interrupt to the main processor. Preferably, the coordinating step coordinates the simultaneous execution of the first and second plurality of tasks. In one aspect, the desired operations include RAID operations.

In one aspect, the storage system controller further includes first and second interrupt management scoreboards (IMS). The first IMS receives a first task status for each of the first plurality of tasks executed, and the second IMS receives a second task status for each of the second plurality of tasks executed. In one aspect, a plurality of intelligent peripheral components and a plurality of device interfaces are provided.

In another method of the present invention, a method of controlling a storage system includes the steps of providing a storage system controller as previously described having an interrupt management scoreboard (IMS), and providing a device coupled with the device interface. The main processor sequences a group of N tasks to be executed to complete a desired operation, and the operations sequencer coordinates an execution of the group of N tasks. The method includes the IMS receiving a task status for each of the N tasks executed by the device. Upon completion of the N tasks, the IMS or the operations sequencer can interrupt the main processor notifying it that the N tasks are complete. Alternatively, the main processor can poll the IMS and/or the sequencer to determine when the N tasks have completed.

In one aspect, the tasks within the group of N tasks are executed in parallel. In another aspect, the method further includes issuing a secondary interrupt to the main processor if the execution of one of the N tasks produces an error, with the main processor initiating a retry of the task producing the error. In another aspect, a plurality of devices are provided, and the coordinating step coordinates an execution of the group of N tasks by the plurality of devices.

In one particular aspect, a plurality of groups of N tasks are sequenced to complete the desired operation. A first group of tasks must be successfully completed before a second group of tasks is executed.

A more complete understanding of the present invention may be derived by referring to the detailed description of preferred embodiments and claims when considered in connection with the figures, wherein like reference numbers refer to similar items throughout the figures.

DESCRIPTION OF THE PREFERRED EMBODIMENT

Figure 1:
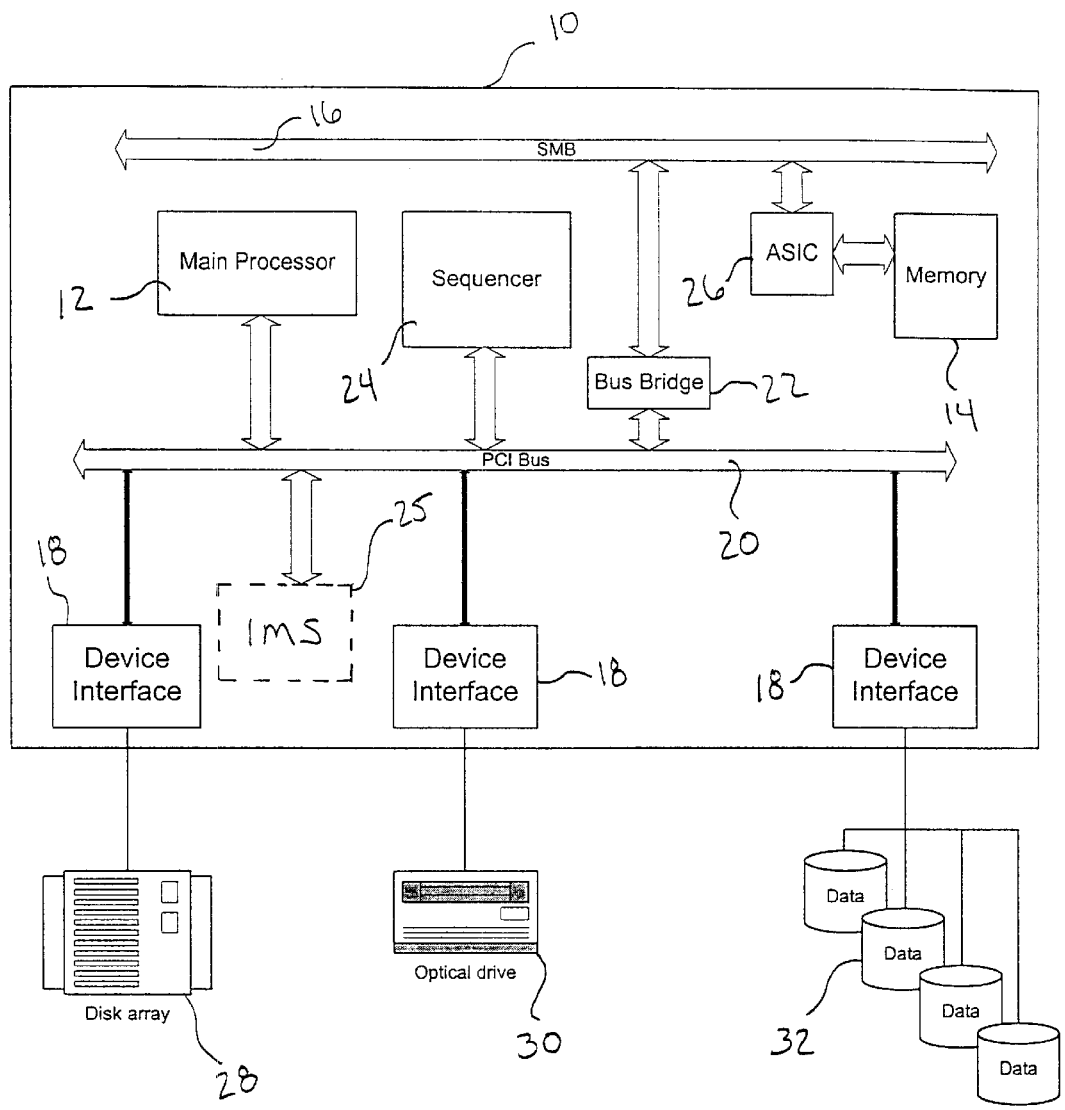
FIG. 1 is an overall schematic of a storage system controller according to the present invention.

FIG. 1 depicts an exemplary storage system controller 10 according to the present invention. In one embodiment, controller 10 is a RAID storage system controller 10. Storage system controller 10 includes a main processor 12 in electrical communication with a peripheral component interconnect (PCI) bus 20, or other suitable system bus used in computer systems. Controller 10 has at least one device interface 18 in electrical communication with PCI bus 20 to permit the interface of a peripheral component with controller 10. Device interfaces 18 may comprise interface components for facilitating communication across any suitable communication platform, including peripheral component interconnect (PCI), small computer system interface (SCSI), universal serial bus (USB), fibre channel, fibrewire, or the like. In addition, device interface(s) 18 may include intelligent capabilities, for example, intelligent ($I_2O$), or the like. Device interfaces 18 are adapted to interface with a wide range of peripheral components. For example, peripheral components may include a disk array 28, an optical drive 30, just a bunch of disks (JBOD) 32, other storage media, scanners and the like. While FIG. 1 depicts controller 10 having three device interfaces 18, it will be appreciated by those skilled in the art that a larger or smaller number of interfaces 18 may be used within the scope of the present invention.

A bus bridge 22 electrically connects PCI bus 20 with a shared memory bus (SMB) 16. In one embodiment, SMB 16 has the capacity to transfer about 533 megabytes per second and PCI bus 20 has the capacity to transfer about 133 megabytes per second. In some embodiments, controller 10 further may include an application specific integrated circuit (ASIC) 26. For example, when storage system controller 10 comprises a RAID controller, ASIC 26 may comprise an exclusive OR (XOR) engine which is used to calculate RAID parity data. A memory 14 may be coupled to ASIC 26 as shown, or coupled to SMB 16.

Storage system controller 10 further includes an operations sequencer 24. Operations sequencer 24 can be a co-processor either in electrical communication with main processor 12 or fabricated on the same chip as main processor 12. Alternatively, sequencer 24 may be a hardware state machine or an intelligent device interface, such as device interface 18 equipped with processing functionality. In one embodiment, sequencer 24 is a RAID accelerator.

As depicted in FIG. 1, sequencer 24 is in electrical communication with main processor 12 via PCI bus 20. However, in alternative embodiments, sequencer 24 may be directly connected to main processor 12, connected to processor 12 via SMB 16, connected to processor 12 via a SCSI connection to the PCI bus 20, or any other suitable connection. Sequencer 24 is adapted to receive an operation from main processor 12 that may include a plurality of tasks. Each task may include one or more subtasks. As described below in further detail, sequencer 24 coordinates the execution of the plurality of tasks making up the operation prior to interrupting main processor 12. Sequencer 24 may have some processing capability to coordinate the execution of the group of tasks.

In one embodiment, controller 10 further includes an interrupt management scoreboard (IMS) 25 to facilitate the coordination and synchronization of the plurality of tasks needed to complete an operation, such as a RAID operation. In the embodiment depicted in FIG. 1, IMS 25 is coupled to PCI bus 20, and either main processor 12 or sequencer 24 may communicate with it via PCI bus 12. In another embodiment, IMS 25 is part of sequencer 24. Further details on exemplary interrupt management scoreboards for use with the present invention are described in U.S. application Ser. No. 09/373,864, entitled "Methods and Apparatus for Using Interrupt Score Boarding with Intelligent Peripheral Devices," the complete disclosure of which was previously incorporated by reference.

Sequencer 24 permits the off-load of the management of interrupts from main processor 12 to sequencer 24 for a RAID operation or other I/O operation. In one embodiment, sequencer 24 has the capability for reprogramming of hardware, such as interface chips, SCSI chips, including direct memory access (DMA) engines and raid parity assist (RPAs). Sequencer 24 further has the capability to execute a number of interrupt service routines normally incurred in processor 12. This provides several advantages, including, fewer context switches incurred by main processor 12. Further, the higher locality of reference within the execution stream seen by main processor 12 results in the better use of primary and secondary cache of the main processor 12. Shorter execution threads for each RAID operation lead to higher RAID I/O throughput for controller 10. Further, sequencer 24 also reduces the main processor's interrupt service routine because main processor 12 may assume that no error handling is necessary for the RAID operation comprising the grouped tasks. Hence, checks for error can be avoided. Preferably, sequencer 24 coordinates and executes the steps and/or tasks set-up by main processor 12. In addition, sequencer 24 preferably performs suitable hardware set-up operations, error checking and interrupt routines for the steps or tasks originally provided by main processor 12 at the start of the execution of each RAID operation.

IMS 25 preferably is set up by main processor 12 or sequencer 24. IMS 25 receives task status information, such as task complete notifications and error notifications, to facilitate the coordinated sequencing of a plurality of tasks. IMS 25 scoreboarding features and methods are discussed in greater detail in U.S. patent application Ser. No. 09/373,864, the complete disclosure of which was previously incorporated by reference.

Figure 2:
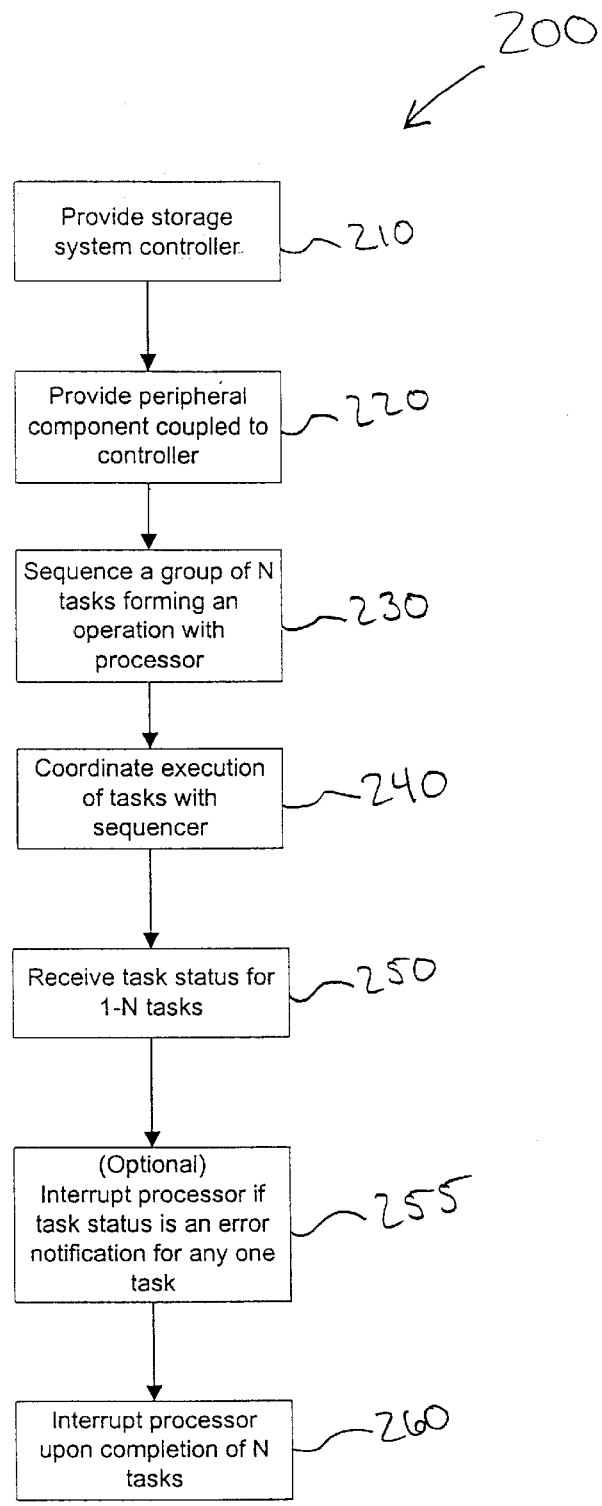
FIG. 2 is a flow-chart describing a method of the present invention.

FIG. 2 depicts a top-level flow chart of an exemplary method 200 according to the present invention. Method 200 includes providing storage system controller 10 as previously described (block 210) and providing a peripheral device, such as a RAID storage system, in electrical communication with device interface 18 (block 220). Main processor 12 preferably sequences a plurality of N tasks to be executed to complete a desired operation (block 230). Operations sequencer 24 receives the plurality of N tasks from processor 12 and coordinates the execution of the tasks (block 240). Depending upon the specific operation, sequencer 24 may coordinate the execution of tasks to be performed with memory 14, ASIC 26, a DMA engine and/or one or more peripheral devices 28–32. The method includes receiving a task status for each task that is executed (block 250) from each of these devices that are responsible for the tasks. As previously mentioned, in alternative embodiments operations sequencer 24 or IMS 25 receives the task status. In one embodiment, the task status is either a task complete notification or an error notification.

The method further includes issuing an interrupt to main processor 12 after all of the tasks of the operation have finished executing (block 260). Additionally, in the event the execution of one or more tasks produced an error, an interrupt may be issued to main processor 12 (block 255). In alternative embodiments operations sequencer 24 or device interface 18 corresponding to the peripheral component experiencing the error may issue the interrupt. Further, operations sequencer 24 may have the capability to handle, and perhaps correct, certain errors, in some cases by requesting a reexecution of the failed task. Alternatively, main processor 12 may initiate a retry of the failed task.

Figure 3:
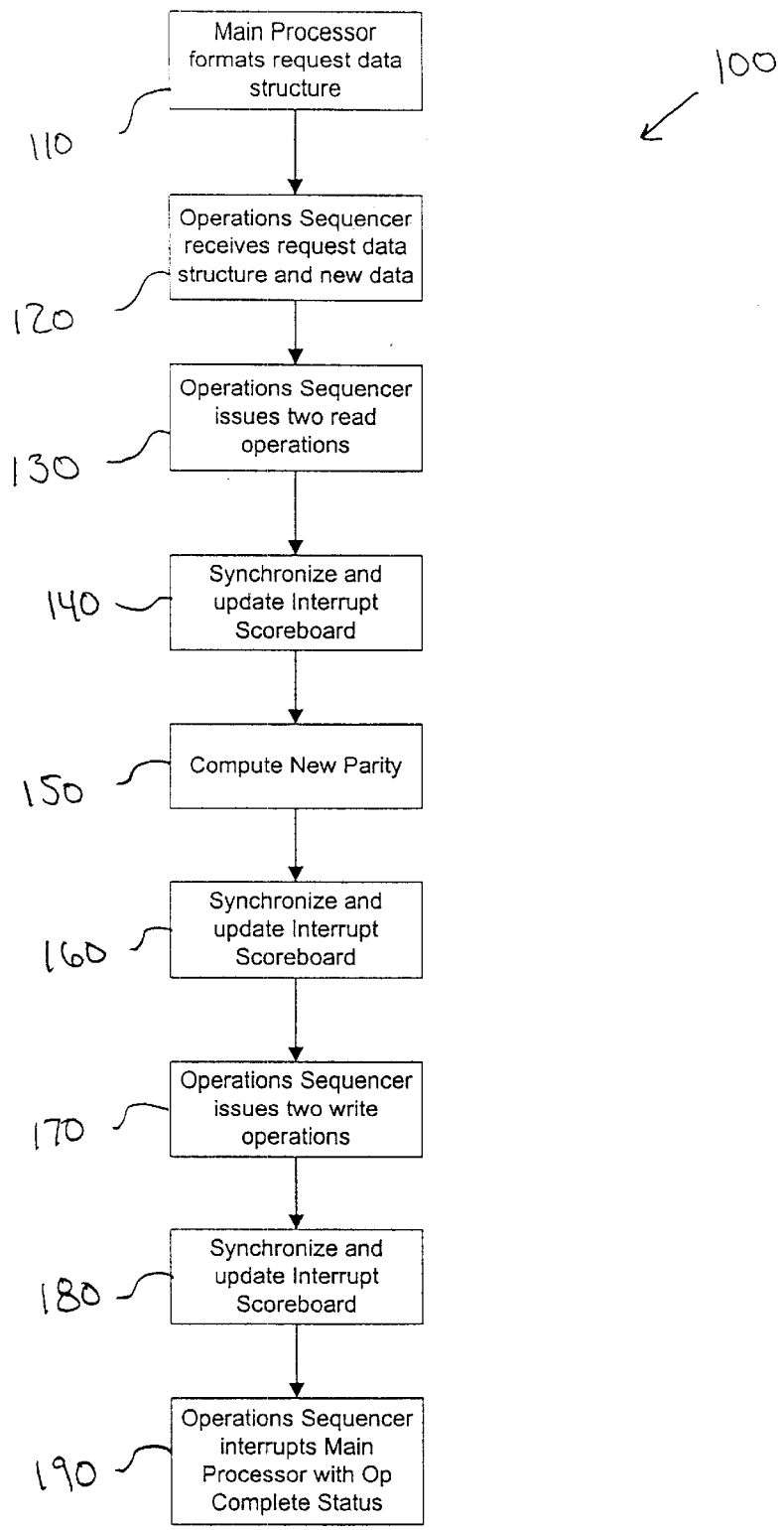
FIGS. 3 and 4 are flow-charts depicting a RAID operation controlled by apparatus and methods of the present invention.
Figure 4:
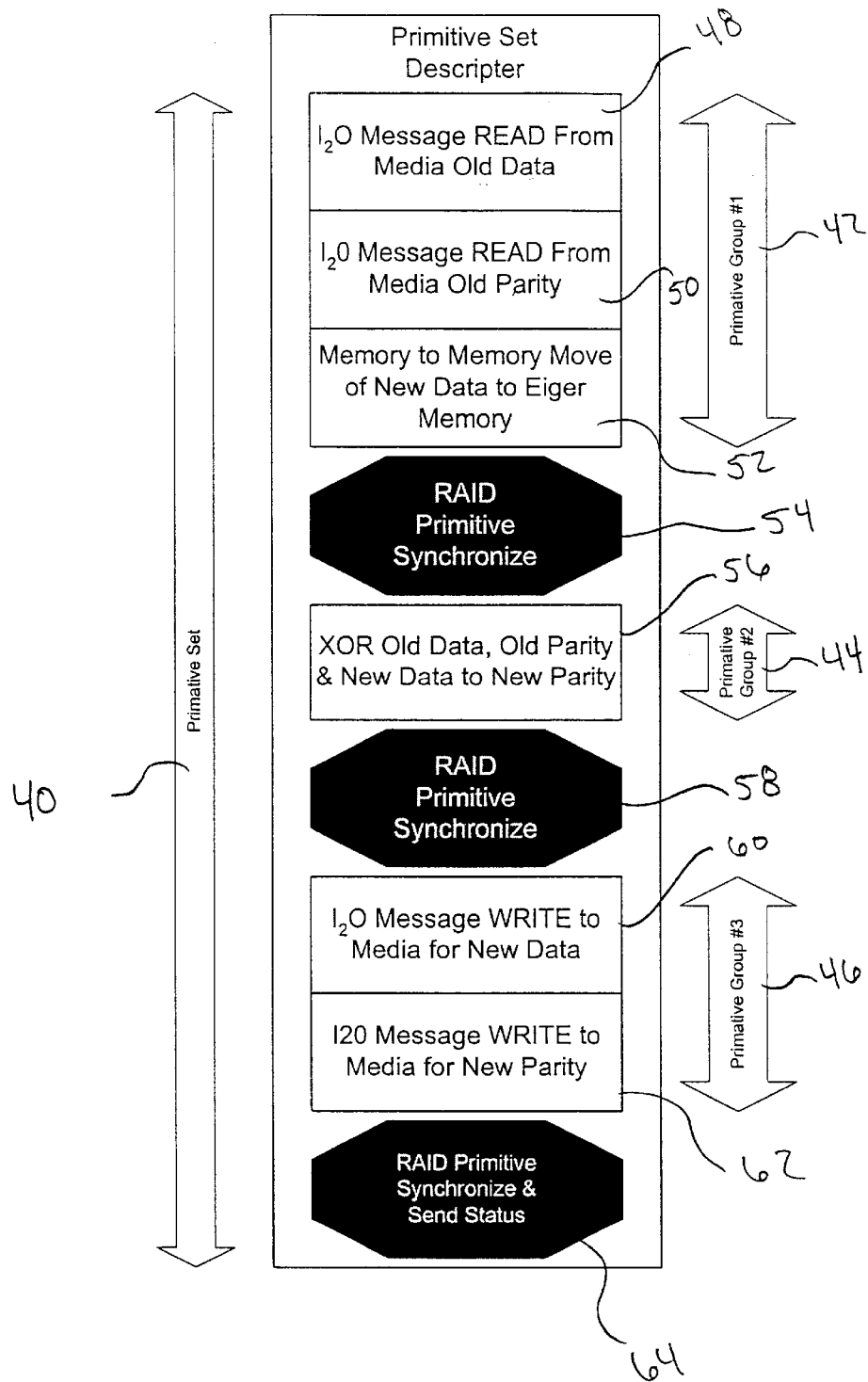

Turning now to FIGS. 3 and 4, one method of using controller 10 for a read/modify/write RAID operation according to the present invention will be described. It will be appreciated by those skilled in the art that the example described in conjunction with FIGS. 3 and 4 is but one of a number of operations for which sequencer 24 may be used. Sequencer 24 may coordinate the execution of a wide range of grouped tasks by main processor 12 in order to off-load overhead from main processor 12. Sequencer 24 also may simultaneously coordinate the execution of multiple RAID operations, each comprising multiple tasks. Therefore, the present invention is not limited to the read/modify/write example described herein. Further, while the operation is described using controller 10 having IMS 25, IMS 25 functions in another embodiment may be accomplished by sequencer 24, or by an IMS contained in sequencer 24.

Method 100 includes the step of main processor 12 formatting an operation data structure which includes all the tasks to be completed to perform the RAID operation (block 110). The plurality of tasks may together comprise a primitive set 40 consisting of one or more primitive groups. In accordance with the embodiment illustrated in FIG. 4, a first primitive group 42, a second primitive group 44 and a third primitive group 46, and one or more synchronization steps make up primitive set 40. Primitive groups 42–46 each consist of one or more primitives or tasks that are partitioned from other primitives groups in primitive set 40 by a synchronization-type primitive. Primitives within a particular primitive group can be executed serially or in parallel. Sequencer 24 will attempt to complete all primitives within a particular primitive group 42–46 prior to coordinating the execution of primitives within the next primitive group 44–46. Sequencer 24 preferably will complete all primitive groups 42–46 before exiting the processing of primitive set 40.

Operation sequencer 24 receives the operation data structure and the new data that is to be used to update the record in the read/modify/write operation (block 120). Main processor 12 or sequencer 24 sets up one or more IMS 25 as further described in U.S. patent application Ser. No. 09/373,864, the complete disclosure of which was previously incorporated by reference. Sequencer 24 then coordinates the execution of first primitive group 42.

As shown in FIG. 4, first primitive group 42 comprises a first read step 48, a second read step 50 and a memory-to-memory move step 52. Steps 48–52 can occur sequentially or simultaneously. Sequencer 24 issues the two read operations to one or more RAID disk drives (depending on the location of the data to be updated) via device interface(s) 18 (block 130). First read step 48 comprises a read of old data residing on one or more storage devices. Second read step 50 comprises a read of old parity also residing on a storage device. Step 52 comprises a memory-to-memory move of new data received, for example, from a network workstation, to memory 14. While described sequentially, block 120 and block 130 also can occur simultaneously.

After sequencer 24 initiates the tasks or steps in first primitive group 42, sequencer 24 preferably waits for each of the tasks to complete. Sequencer 24 will not begin the tasks in second primitive group 44 until all the tasks from first primitive group 42 complete. IMS 25 is updated at the completion of each step 48–52 within first primitive group 42. IMS 25 can be updated by the device 28–32 performing a particular step or task by the device interface 18 corresponding to the device 28–32 executing the step or tasks, or by sequencer 24 upon completion of each step or task. In one embodiment, IMS 25 receives a step or task complete notification or an error notification, depending on whether that step is successfully executed.

In the event one of the tasks produces an error, in one embodiment an interrupt is issued to main processor 12. The interrupt is issued, in one embodiment, by device interface 18 corresponding to the device 28–32 executing the task which produced the error. Main processor 12 may initiate a retry of the failed task. If successful, IMS 25 is updated with a task complete notification, preferably from device interface 18. Alternatively, sequencer 24 writes a task status to IMS 25, and sequencer 24 continues coordinating first primitive group 42.

In another embodiment, sequencer 24 has sufficient processing capability to attempt a retry or correction of low level primitives in the event of an error or failure of a task. In this manner, sequencer 24 further provides the offload of overhead and interrupts related thereto to the identification and correction of minor errors within RAID operation primitive set 40.

The use of controller 10 with intelligent input/output device interfaces permits the use of sequencer 24 without requiring sequencer 24 to have significant processing capability. In this manner, device interface 18 can issue the interrupt to main processor 12 in the event that device interface 18 detects an error in a task to which it was directed. Alternatively, operation sequencer 24 performs the step of issuing the interrupt to main processor 12 as a result of an error during task execution.

Sequencer 24 performs a synchronization task 54 to ensure that steps 48–52 complete successfully. If primitive group 42 has successfully completed, IMS 25 is updated in one embodiment (block 140). In one embodiment, IMS 25 is set up by sequencer 24 for primitive group 44 after the successful completion of all tasks in primitive group 42. Alternatively, each primitive group 42–46 has an associated IMS 25. In such an embodiment, sequencer 24 proceeds with second primitive group 44 upon successful completion of first primitive group 42 as indicated on IMS 25 associated with first primitive group 42. Sequencer 24 then coordinates the execution of second primitive group 44.

In accordance with the illustrated example, second primitive group 44 includes a single step 56 involving the computation of a new parity data. Operations sequencer 24 issues an operation, preferably to ASIC 26, to compute new parity (block 150). The method includes synchronizing the RAID operation and updating the interrupt scoreboard after new parity has been computed (block 160). Second primitive group 44 can have a dedicated IMS 25, or use the same IMS 25 as used for first primitive group 42. A second RAID primitive synchronization step 58 ensures that the parity computation task completes successfully. Sequencer 24 then coordinates the execution of third primitive group 46.

Third primitive group 46 includes two write steps; a first write step 60 writes the new data to the storage media, such as to RAID storage disks, and a second write step 62 includes writing the new parity to the storage media. Sequencer 24 issues two write operations, one for the new data and one for the new parity (block 170). As with earlier primitive groups 42–44, steps 60 and 62 in third primitive group 46 can occur simultaneously or sequentially. Task status for steps 60 and 62 are reported to IMS 25 set up for third primitive group 46, which again may comprise the same IMS 25 as used for first primitive group 42 and second primitive group 44. Error handling, if needed, can be accomplished as discussed for first primitive group 42. If the steps 60 and 62 complete properly, sequencer 24 updates the interrupt scoreboard (block 180), and a third RAID primitive synchronization step 64 occurs.

After completion of primitive set 40, main processor 12 is interrupted. In one embodiment, sequencer 24 interrupts main processor 12 (block 190). Alternatively, main processor 12 polls IMS(s) 25 to determine if primitive set 40 is complete. Hence, after all the primitive groups complete successfully, control is passed back to main processor 12.

By providing operations sequencer 24 as described above, main processor 12 can define a group of tasks needed to perform a RAID operation, and sequencer 24 can coordinate the execution of these tasks without main processor 12 being interrupted after the completion of each task. When all tasks are successfully completed, main processor 12 is interrupted.

Operations sequencer 24 is further capable of handling more than one packaged operation simultaneously. For example, sequencer 24 may receive a first and a second plurality of tasks to be executed to complete first and second operations, such as first and second RAID operations, respectively. Sequencer 24 coordinates the execution of tasks within both operations.

The invention has now been described in detail. However, it will be appreciated that certain changes and modifications may be made. Therefore, the scope and content of this invention are not limited by the foregoing description. Rather, the scope and content are to be defined by the following claims.

What is claimed is:

1. A method of controlling a storage system comprising:
   providing a storage system controller comprising a main processor, a memory, a device interface, and an operations sequencer;
   providing a storage system in electrical communication with said device interface;
   said main processor sequencing a first plurality of tasks to be executed to complete a desired operation;
   said operations sequencer receiving said first plurality of tasks from said main processor and coordinating an execution of said first plurality of tasks; and
   issuing a primary interrupt to said main processor after all of said first plurality of tasks are executed.

2. A method as in claim 1, wherein said storage system controller further comprises an interrupt management scoreboard in communication with said operations sequencer.

3. A method as in claim 2, further comprising said interrupt management scoreboard receiving a task status for each of said first plurality of tasks that is executed, said task status comprising an error notification or a task complete notification.

4. A method as in claim 2, further comprising issuing a secondary interrupt to said main processor if said execution of one of said first plurality of tasks results in an error notification.

5. A method as in claim 4, wherein said device interface issues said secondary interrupt.

6. A method as in claim 4, further comprising said main processor issuing a retry command to said device interface in response to said secondary interrupt.

7. A method as in claim 6, further comprising said main processor writing a task complete notification status to said interrupt management scoreboard if said retry completes successfully.

8. A method as in claim 1, wherein said operations sequencer issues said primary interrupt to said main processor.

9. A method as in claim 1, wherein said sequencing step comprises sequencing said first plurality of tasks into a desired execution sequence, and said coordinating step comprises coordinating said execution of said first plurality of tasks in accordance with said desired execution sequence.

10. A method as in claim 1, further comprising sequencing a second plurality of tasks to be executed to complete a second desired operation, coordinating a second execution of said second plurality of tasks, and issuing a second primary interrupt to said main processor.

11. A method as in claim 10, wherein said first and said second desired operations comprise RAID operations.

12. A method as in claim 10, wherein said storage system controller further comprises first and second interrupt management scoreboards (IMS) in communication with said operations sequencer, said first IMS receiving a first task status for each of said first plurality of tasks that is executed and said second IMS receiving a second task status for each of said second plurality of tasks that is executed.

13. A method as in claim 1, further comprising sequencing a second plurality of tasks to be executed to complete a second desired operation, and said coordinating step comprises coordinating a simultaneous execution of said first and said second plurality of tasks.

14. A method as in claim 1, wherein said providing steps further comprise providing a plurality of intelligent peripheral components and a plurality of device interfaces.

15. A method of controlling a storage system comprising:
   (a) providing a storage system controller comprising a main processor, a memory, a device interface, an interrupt management scoreboard and an operations sequencer;
   (b) providing a device coupled with said device interface;
   (c) said main processor sequencing a group of N tasks to be executed by said device to complete a desired operation;
   (d) said operations sequencer coordinating an execution of said group of N tasks;
   (f) said interrupt management scoreboard receiving a task status for each of said N tasks executed by said device; and
   (g) issuing a primary interrupt to said main processor after said group of N tasks has been executed.

16. A method as in claim 15, wherein said group of N tasks are executed in parallel.

17. A method as in claim 15, further comprising issuing a secondary interrupt to said main processor if said execution of one of said N tasks produces an error, said main processor initiating a retry of said task producing said error message.

18. A method as in claim 15, wherein said providing a device step comprises providing a plurality of devices, and said coordinating step comprises coordinating an execution of said group of N tasks by said plurality of devices.

19. A method as in claim 15, wherein said sequencing step comprises sequencing a plurality of groups of N tasks to complete said desired operation, and wherein a second group of said plurality of groups of N tasks will not execute until a first group of said plurality of groups of N tasks completes successfully.

20. A storage system controller comprising:
   a main processor;
   a memory coupled to said main processor;
   a device interface adapted to interface a peripheral component with said storage system controller; and
   an operations sequencer adapted to receive an operation comprising a plurality of tasks from said main processor and to coordinate the execution of said plurality of task of said operation prior to interrupting said main processor.

21. A storage system controller as in claim 20, wherein said main processor comprises a RAID controller processor, said operations sequencer comprises a RAID accelerator, and said peripheral component comprises a RAID storage device.

22. A storage controller as in claim 20, wherein said operations sequencer comprises a co-processor in electrical communication with said main processor.

23. A storage system controller as in claim 20, wherein said operations sequencer comprises a co-processor disposed within said main processor.

24. A storage system controller as in claim 20, wherein said operations sequencer comprises a hardware state machine.

25. A storage system controller as in claim 20, wherein said operations sequencer comprises an intelligent device interface.

26. A storage system controller as in claim 20, wherein said device interface comprises a plurality of device interfaces adapted to interface with a plurality of peripheral components.

27. A storage system controller as in claim 20, further comprising an interrupt management scoreboard in communication with said operations sequencer.

* * * * *